United States Patent [19]

Otani

[11] Patent Number: 4,807,254
[45] Date of Patent: Feb. 21, 1989

[54] CARRIER WAVE RECOVERY SYSTEM

[75] Inventor: Susumu Otani, Tokyo, Japan

[73] Assignee: NEC Corporation, Tokyo, Japan

[21] Appl. No.: 893,847

[22] Filed: Aug. 6, 1986

[30] Foreign Application Priority Data

Aug. 9, 1985 [JP] Japan .................................. 60-175215
Dec. 4, 1985 [JP] Japan .................................. 60-272698

[51] Int. Cl.⁴ .......................... H04L 27/06; H04J 3/06
[52] U.S. Cl. ........................................ 375/81; 375/93; 375/97; 375/106; 370/104
[58] Field of Search ................... 375/81, 97, 118, 119, 375/120, 87, 110, 93, 106, 107; 455/258, 264, 265, 323; 331/1 A, 17; 329/122; 370/100, 104

[56] References Cited

U.S. PATENT DOCUMENTS 4,561,099 12/1985 Atsugi et al. .......................... 375/97
4,563,767 1/1986 Brandt ................................. 375/120

Primary Examiner—Robert L. Griffin
Assistant Examiner—Marianne Huseman
Attorney, Agent, or Firm—Sughrue, Mion, Zinn, Macpeak & Seas

[57] ABSTRACT

A carrier wave recovery system for a slotted ALOHA system is disclosed. In a time slot where a burst is not inputted, the frequency of oscillator means is locked to a mean value of carrier wave frequencies of bursts which were received in the past, thereby allowing a minimum of initial frequency offset to occur. A voltage controlled oscillator frequency is controlled at initial pull-in to an average frequency of the highest and lowest carrier wave frequencies of an input burst signal.

2 Claims, 3 Drawing Sheets

CARRIER WAVE RECOVERY SYSTEM

BACKGROUND OF THE INVENTION

The present invention relates to a carrier wave recovery system and, more particularly, to a carrier wave recovery system for a slotted ALOHA system.

In a slotted ALOHA system which belongs to a family of time division multiple access (TDMA) communication systems, time slots each having a predetermined duration are set up beforehand so that multiple stations may individually transmit signals in bursts using such time slots. A burst demodulator adapted to receive the bursts is required to recover on a burst-by-burst basis a reference carrier wave whose frequency is synchronous to a carrier wave component. In such a prior art system, it has been customary to recover a reference carrier wave by means of a phase locked loop which consists of a phase comparator, a low-pass filter, and a voltage controlled oscillator (VCO) which is phase-locked to a carrier component of a burst. In a time slot where a burst is not inputted, the VCO is brought into a self-driven oscillation state since the output of the phase comparator disappears; generally, in this state of the VCO, the frequency stability is not high. This gives rise to a problem that in the self-driven oscillation state the VCO oscillation frequency fluctuates over a substantial range, resulting in a substantial difference between a carrier component frequency and a VCO oscillation frequency, i.e., initial frequency offset when a burst with the carrier component frequency is inputted. Because an initial frequency offset determines a tuning time of a phase locked loop, a great initial frequency offset makes the tuning time disproportionately long and renders the operation of the phase locked loop itself unstable.

SUMMARY OF THE INVENTION

It is therefore an object of the present invention to provide a carrier wave recovery system which effects recovery rapidly and stably.

It is another object of the present invention to provide a generally improved carrier wave recovery system.

In accordance with the present invention, there is provided a carrier wave recovery system for recovering a reference carrier wave from each of burst carrier waves which are sequentially inputted in bursts at a period which is equal to a predetermined period of time or an integral multiple of the predetermined period of time and not always constant, the burst carrier waves each being not longer than the predetermined period of time. The system comprises a phase comparator for comparing in phase each of the burst carrier waves and the reference carrier wave to produce an error signal, an averaging circuit for averaging values of the error signals which are associated with the burst carrier waves inputted in the past and storing a resultant mean value, an adder for adding the error signal and the mean value stored in the averaging circuit, and an oscillator for controlling an oscillation frequency in response to an output of the adder to produce the reference carrier wave.

In accordance with the present invention, there is also provided a carrier wave recovery system for recovering by means of a phase locked loop a reference carrier wave out of each of burst carrier waves which are sequentially inputted in bursts at a period which is equal to a predetermined period of time or an integral multiple of the predetermined period of time and not always constant, the burst carrier waves each being not longer than the predetermined period of time. The system comprises an oscillator an oscillation frequency of which is controlled by a control signal, a phase comparator for comparing in phase an output of the oscillator and the burst carrier wave to produce an error signal, an averaging circuit for determining a mean value of the control signals, which are associated with the burst signals inputted in the past, from a maximum and a minimum values of the control signals and storing the mean value, and an adder for adding the error signal and the mean value stored in the averaging circuit and producing a resultant sum as the control signal. The oscillator, adder and phase comparator constitutes the phase locked loop so that when an output of the oscillator has been synchronized to a phase of the burst carrier wave, that output becomes the reference carrier wave.

The above and other objects, features and advantages of the present invention will become more apparent from the following detailed description taken with the accompanying drawings.

DESCRIPTION OF THE PREFERRED EMBODIMENTS

Figure 1:
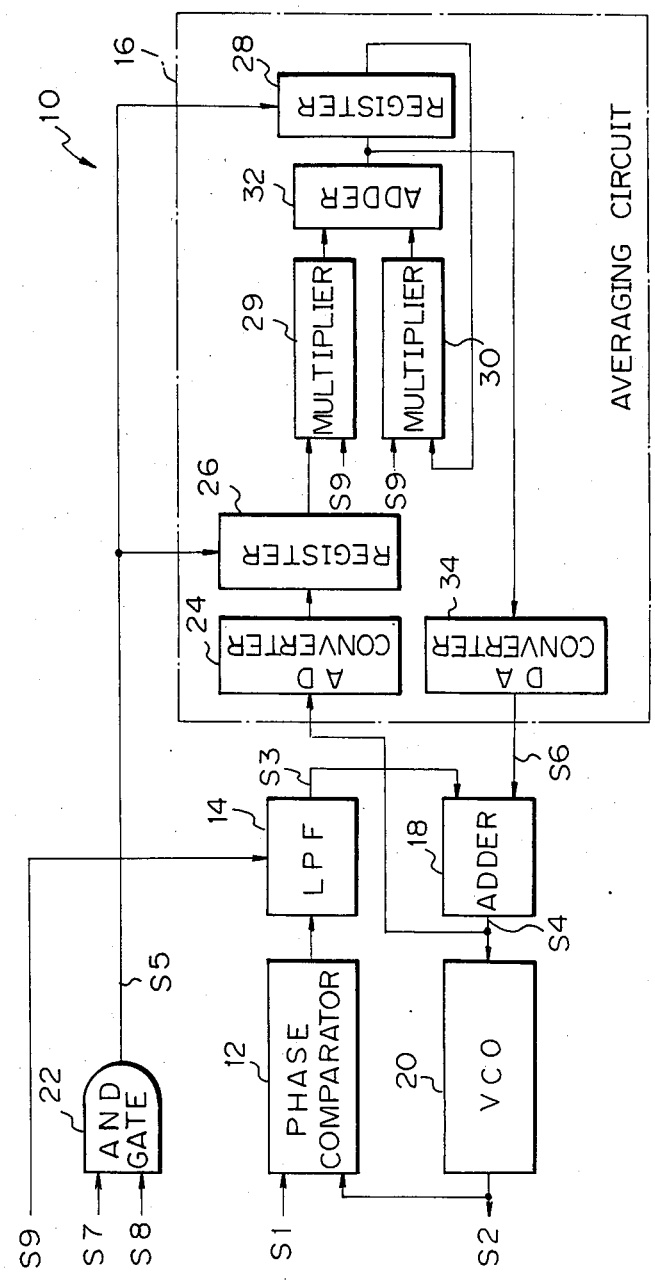
FIG. 1 is a block diagram of a carrier wave recovery system embodying the present invention.

Referring to FIG. 1 of the drawings, a carrier wave recovery system in accordance with the present invention is shown and generally designated by the reference numeral 10. As shown, the system 10 includes a phase comparator 12 adapted to compare in phase a burst carrier wave signal S1 with a reference carrier wave signal S2. A result of comparison from the phase comparator 12 is applied to a low-pass filter (LPF) 14 which then produces a low-frequency component of the output of the phase comparator 12 as an error signal S3. An averaging circuit 16 receives a VCO control signal S4 and a reset signal S5 and, in turn, produces a mean signal S6. The error signal S3 and mean signal S6 are fed to an adder 18. The output of the adder 18 is routed to a VCO 20 which is adapted to oscillate the reference carrier wave signal S2. An AND gate 22 functions to gate a slot timing signal S7 in response to a burst detection signal S8 and delivers it as the reset signal S5.

The averaging circuit 16 includes an analog-to-digital (AD) converter 24 for converting the VCO control signal S4 into a digital signal, a register 26 for storing an output of the AD converter 24 which has appeared at the time of entry of the reset signal S5, and multipliers 29 and 30 for respectively multiplying data stored in the register 26 and data stored in another register 28 by a coefficient signal S9 representative of a coefficient of 0.5. The circuit 16 further includes an adder 32 for adding products outputted by the multipliers 29 and 30, the register 28 for storing an output of the adder 32 which has appeared at the instant of entry of the reset signal S5, and a digital-to-analog (DA) converter 34 for converting an output of the adder 32 into the mean signal S6, which is an analog signal.

The carrier recovery system 10 having the above construction will be operated as follows.

The burst carrier wave signal S1 is a burst-like carrier wave component which has been extracted from an inputted burst by a Costas loop method or any other carrier wave extracting method as well known in the art. In a time slot where a burst is inputted, the signal S1 is compared with the reference carrier wave signal S2 outputted by the VCO 20 by the phase comparator 12, the result of comparison being delivered as the error signal S3 via the LPF 14. The burst detection signal S8 is a signal which appears when an inputted burst has been surely received and a unique word has been detected out of the burst. The slot timing signal S7 is a signal having a constant period representative of a slot timing. The signal S7 is gated by the AND gate 22 in response to the signal S8. Hence, the AND gate 22 produces the reset signal S5 every time a burst is surely received.

The operation of the averaging circuit 16 will be described first. At the instant of entry of a new burst, a VCO control signal S4 associated with the latest burst which has been entered before is held in the register 26 via the AD converter 24. Let the value of the VCO control signal S4 held in the register 26 be $V_{n-1}$, and the value held in the register 28 at that time $\overline{V}_{n-1}$. When the newly entered burst has been surely received, the AND gate 22 produces a reset signal S5 with the result that the content of the register 26 is updated to become a control signal S4 of this instant, i.e. a value $V_n$ outputted by the AD converter 24. Simultaneously, the content of the register 28 is updated to become $\overline{V}_n$. Due to the operations of the multiplier 29 and adder 32, $\overline{V}_n$ is an arithmetical mean of $V_{n-1}$ and $\overline{V}_{n-1}$. Hence, until the next burst is surely received, the output of the adder 32 is representative of a mean value of digital versions of control signals S4 outputted by the AD converter 24 and associated one with each burst received in the past, a later burst being weighted more than an older burst before being averaged. The output of the adder 32 is processed by the DA converter 34 to become an analog mean signal S6. In the same sense as just stated, the mean signal S6 is representative of a mean value of error signals S3 which lies between the maximum and minimum values of control signals S4, which are associated one-to-one with the bursts.

The oscillation frequency of the VCO 20 is controlled by a sum of the error signal S3 and the mean signal S6. In a time slot with a burst, the VCO 20 is controlled by the sum to be phase-locked to the burst carrier wave signal S1 with the result that the frequency of the reference carrier wave signal S2 coincides with that of the carrier wave signal S1. In a time slot without a burst, the signal S1 and, therefore, the signal S3 does not appear so that the VCO 20, which is supplied with the mean signal S6 only, oscillates at a frequency corresponding to the mean signal S6, i.e. average frequency of carrier wave components of bursts which were entered in the past.

Assume a case wherein use is made of a low-pass filter or a phase comparator which makes the error signal S3 indefinite when the burst carrier wave signal S1 is absent. In such a case, the low-pass filter is discharged by a burst arrival prediction signal S9 to cause the VCO control signal S4 to coincide with the mean signal S6. The initial frequency offset at the time of entry is representative of a difference between a mean frequency of carrier wave components of bursts received in the past and a frequency of a carrier frequency of a newly entered burst and, hence, it is smaller than the greatest one of carrier wave frequency errors associated with the bursts. Because in a time slot without a burst the carrier wave frequency error of each burst is far smaller than the fluctuation of oscillation frequency under the self-driven VCO oscillation condition, the initial frequency in this particular embodiment is negligibly small.

While the averaging circuit 16 has been shown and described as performing signal processing in a digital fashion, it may be constructed to effect analog signal processing in which case the AD converter 24 and DA converter 34 are needless.

As described above, the carrier wave recovery circuit in accordance with this particular embodiment is operable rapidly and stably since in a time slot without a burst it maintains the initial frequency offset very small by controlling the oscillation frequency of oscillator means to a mean value of carrier wave signals of bursts received in the past.

Figure 2:
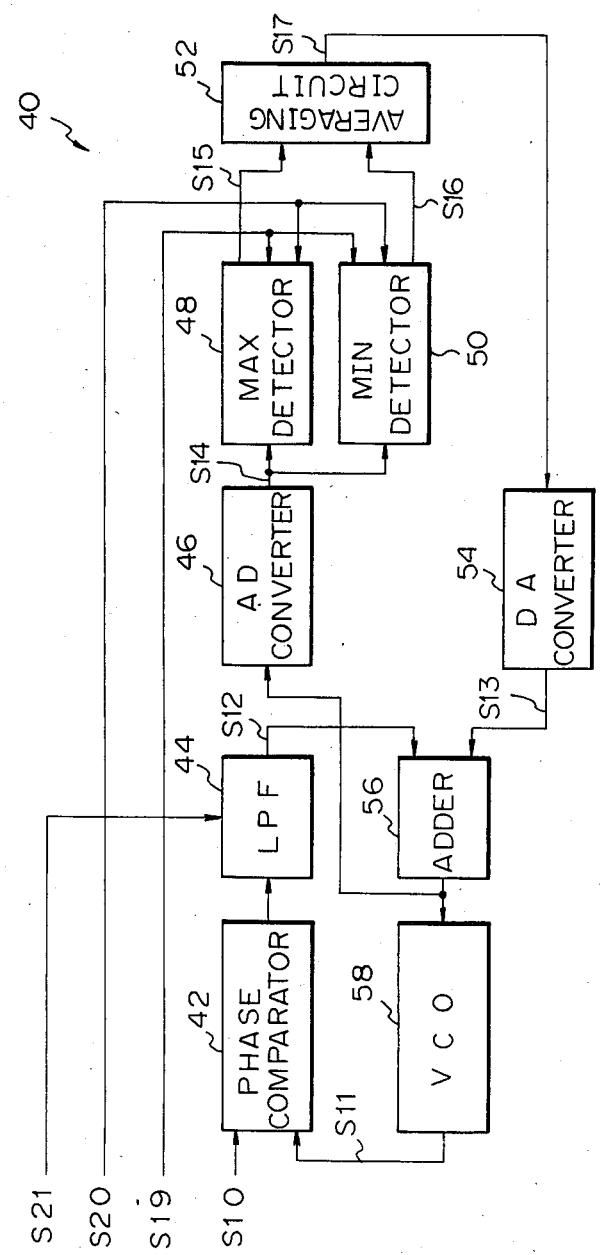
FIG. 2 is a block diagram showing another embodiment of the present invention.

Referring to FIG. 2, another embodiment of the present invention is shown in a block diagram. The carrier wave recovery system, generally 40, includes a phase comparator 42 for comparing in phase a burst carrier wave signal S10 and a VCO output signal S11, and LPF 44 for producing a low-frequency component of an output of the phase comparator 42 as an error signal S12, an AD converter 46 for converting an analog VCO control signal S13 into a digital signal S14, a maximum detector 48 and a minimum detector 50 adapted to respectively detect a maximum and a minimum value of incoming bursts out of the digital signal S14, an averaging circuit 52 for producing a mean value from outputs S15 and S16 of the detectors 48 and 50, a DA converter 54 for converting an output signal S17 of the averaging circuit 52 into an analog means signal S18, an adder 56 for adding the error signal S12 and the means signal S18, and a VCO 58.

Figure 3:
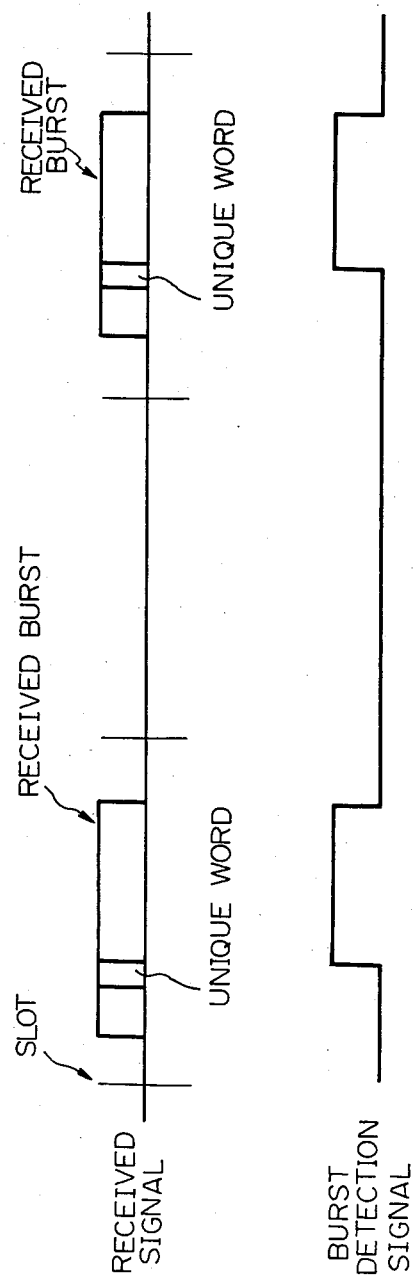
FIG. 3 is a timing chart representative of a relationship between a burst detection signal and a received signal in accordance with the embodiment of FIG. 2.

In operation, the phase comparator 42 compares the phase of a burst carrier wave signal S10 with a VCO output signal S11. If a burst is inputted, the result of comparison is passed through the LPF 44 to become an error signal S12 which is routed through the adder 56 to control the VCO 58 to thereby complete a phase locked loop. A burst detection signal S19 is a signal which appears when, for example, a unique word usually received together with a burst is detected. A relationship between the signal S19 and the received signal is shown in a timing chart in FIG. 3. Updating operations which the detectors 48 and 50 perform as will be described occur at each positive-going edge of the burst detection signal S19.

The VCO control signal S13 is converted into a digital signal by the A/D converter 46 and, then, applied to the maximum detector 48 and minimum detector 50. When the input signal S14 is greater than the output signal S15, the maximum detector 48 replaces the output signal with the input signal. This manipulation is performed only when a burst is detected. The minimum detector 50, on the other hand, replaces the the input signal S14 with the output signal S16 when the former is smaller than the latter. This manipulation, too, is performed only when a burst is detected.

Because the digital signal S14 is equivalent to the VCO control signal S13, the output frequency of the VCO 58 may be determined based on the modulation sensitivity (hertz per volt) of the VCO 58. The signal S15 is representative of a VCO control signal S13 associated with the frequency of one of input bursts which has the highest frequency, and the signal S16 a VCO control signal S13 associated with the frequency of one of input bursts which has the lowest frequency. It follows that the signal S17, i.e., the mean value of the signals S17 and S16 as produced by the averaging circuit 52 corresponds to the VCO control signal S13 which correspond to an average frequency of the lowest and highest frequencies of a received burst signal. The average frequency signal S17 is converted into an analog signal by the DA converter 54 to serve as a mean control signal S18.

The control signal S20 plays an essential role in resetting the maximum detector 48 and minimum detector 50 at an initial condition and coping with long-term frequency fluctuation which may occur in the transmission channel. For example, when the input burst signal frequency has shifted to a higher value due to the fluctuation of an oscillation frequency of a satellite repeater, the minimum detector fails to be updated and, in this condition, the detectors 48 and 50 have to be initialized by the control signal S20 at a long period. The control signal S21 is adapted to discharge the LPF 44 just before a position where a predetermined burst is to be received, so that the frequency of the VCO output signal S11 may constantly represent a mean value of the maximum and minimum frequencies of bursts.

It is to be noted that the circuitry consisting of the AD converter 46, maximum detector 48, minimum detector 50, averaging circuit 52 and DA converter 54 as shown in FIG. 2 may be modified to process signals in an analog fashion in which case the AD converter 46 and DA converter 54 are needless.

As described above, the carrier wave recovery system in accordance with this particular embodiment performs recovery rapidly and stably since a VCO frequency is controlled to an average frequency of a highest and a lowest frequencies of an input burst signal at the time of initial pull-in.

Various modifications will become possible for those skilled in the art after receiving the teachings of the present disclosure without departing from the scope thereof.

What is claimed is:

1. A carrier wave recovery system for recovering a reference carrier wave from each of burst carrier waves which are sequentially inputted from a plurality of transmitting stations to said system in bursts at a period which is equal to a predetermined period of time or an integral multiple of the predetermined period of time and not always constant, the burst carrier waves each being not longer than the predetermined period of time, said system comprising:
    phase comparator means for comparing in phase each of the burst carrier waves and the recovered reference carrier wave to produce an error signal based on the burst carrier waves from said plurality of stations;
    averaging means, responsive to a timing signal indicative of burst reception, for averaging the error signals which are associated with the burst carrier waves inputted to said system in the past and storing a resultant mean value;
    adder means for adding the error signal and the mean value stored in said averaging means; and
    oscillator means for controlling an oscillation frequency in response to an output of said adder means to produce the recovered reference carrier wave.

2. A carrier wave recovery system for recovering by means of a phase locked loop a reference carrier wave out of each of burst carrier waves which are sequentially inputted from a plurality of transmitting stations to said system in bursts at a period which is equal to a predetermined period of time or an integral multiple of the predetermined period of time and not always constant, the burst carrier waves each being not longer than the predetermined period of time, said system comprising:
    oscillator means, an oscillation frequency of which is controlled by a control signal;
    phase comparator means for comparing in phase an output of said oscillator means and each of the burst carrier waves to produce an error signal based on the burst carrier waves from said plurality of stations;
    averaging means, responsive to a timing signal indicative of burst reception, for determining a mean value of the control signals, which are associated with the burst signals inputted in the past, from a maximum and a minimum value of the control signals and storing the mean value; and
    adder means for adding the error signal and the mean value stored in said averaging circuit and producing a resultant sum as the control signal;
said oscillator means, adder means and phase comparator means constituting said phase locked loop so that when an output of said oscillator means has been synchronized to a phase of the burst carrier wave, said output becomes the recovered reference carrier wave.

* * * * *